(12) United States Patent
Pu et al.

(10) Patent No.: US 12,371,055 B2
(45) Date of Patent: Jul. 29, 2025

(54) METHOD, SYSTEM, ELECTRONIC DEVICE AND STORAGE MEDIUM FOR CONSTRUCTING LOCAL CONVEX FEASIBLE SPACE

(71) Applicants: Chongqing University, Chongqing (CN); Shanghai University, Shanghai (CN)

(72) Inventors: Huayan Pu, Chongqing (CN); Hai Liu, Chongqing (CN); Xuyang Zheng, Chongqing (CN); Jun Luo, Chongqing (CN); Jie Ma, Chongqing (CN); Jing Huang, Chongqing (CN); Yongbing Chen, Chongqing (CN); Hongliang Liu, Chongqing (CN); Anming Shen, Chongqing (CN); Haonan Sun, Chongqing (CN)

(73) Assignees: Chongqing University, Chongqing (CN); Shanghai University, Shanghai (CN)

( * ) Notice: Subject to any disclaimer, the term of this patent is extended or adjusted under 35 U.S.C. 154(b) by 343 days.

(21) Appl. No.: 18/181,701

(22) Filed: Mar. 10, 2023

(65) Prior Publication Data

US 2024/0116533 A1    Apr. 11, 2024

(30) Foreign Application Priority Data

Sep. 30, 2022   (CN) .......................... 202211212124.7

(51) Int. Cl.
*B60W 60/00*    (2020.01)
*G06T 17/00*    (2006.01)

(52) U.S. Cl.
CPC ......... *B60W 60/001* (2020.02); *G06T 17/005* (2013.01); *B60W 2520/06* (2013.01);
(Continued)

(58) Field of Classification Search
CPC .......... B60W 60/001; B60W 2520/06; B60W 2530/201; B60W 2554/4041;
(Continued)

(56) References Cited

U.S. PATENT DOCUMENTS 9,183,685 B2 *  11/2015  Ricci ........................ G07C 5/08
10,185,917 B2 *  1/2019  Greystoke .......... G06Q 30/0619
(Continued)

*Primary Examiner* — Redhwan K Mawari
(74) *Attorney, Agent, or Firm* — Brown & Michaels, PC

(57) ABSTRACT

A method, system, electronic device and storage medium for constructing locally convex feasible space are provided. The method includes acquiring a plurality of initial motion trajectory points, size information and surrounding obstacle information of a target vehicle; generating a quadtree map according to the above information; determining a target distance corresponding to each initial motion trajectory point according to the quadtree map; allocating locally convex feasible space to a first-type initial motion trajectory point by using the quadtree map, and allocating locally convex feasible space to a second-type initial motion trajectory point by using an improved convex feasible set algorithm. The first-type initial motion trajectory point is an initial motion trajectory point with the target distance greater than or equal to a set threshold; and the second-type initial motion trajectory point is an initial motion trajectory point with the target distance less than the set threshold.

10 Claims, 4 Drawing Sheets

(52) U.S. Cl.
CPC ............... *B60W 2530/201* (2020.02); *B60W 2554/4041* (2020.02); *B60W 2554/80* (2020.02)

(58) Field of Classification Search
CPC ............ B60W 2554/80; G06T 17/005; G01C 21/3446; G01C 21/20
See application file for complete search history.

(56) References Cited

U.S. PATENT DOCUMENTS

| | | | |
|---|---|---|---|
| 11,451,870 B1* | 9/2022 | Panchaksharaiah | ........................ H04N 21/4666 |
| 2017/0161618 A1* | 6/2017 | Swaminathan | ......... G06F 16/23 |
| 2025/0111944 A1* | 4/2025 | Alves Luz Viana | ... G16H 50/20 |

* cited by examiner

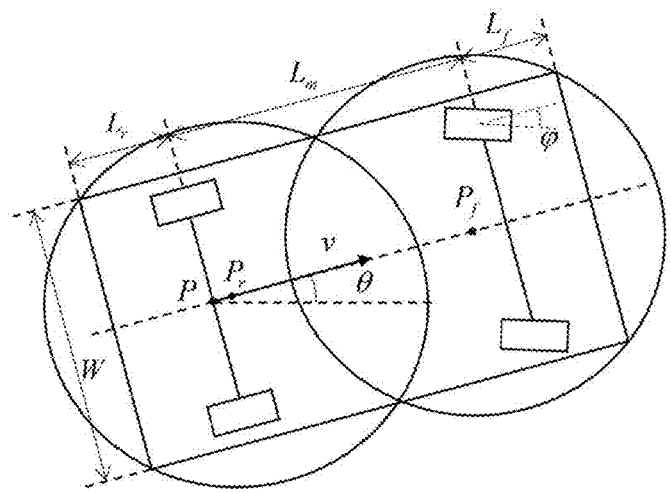
FIG. 2
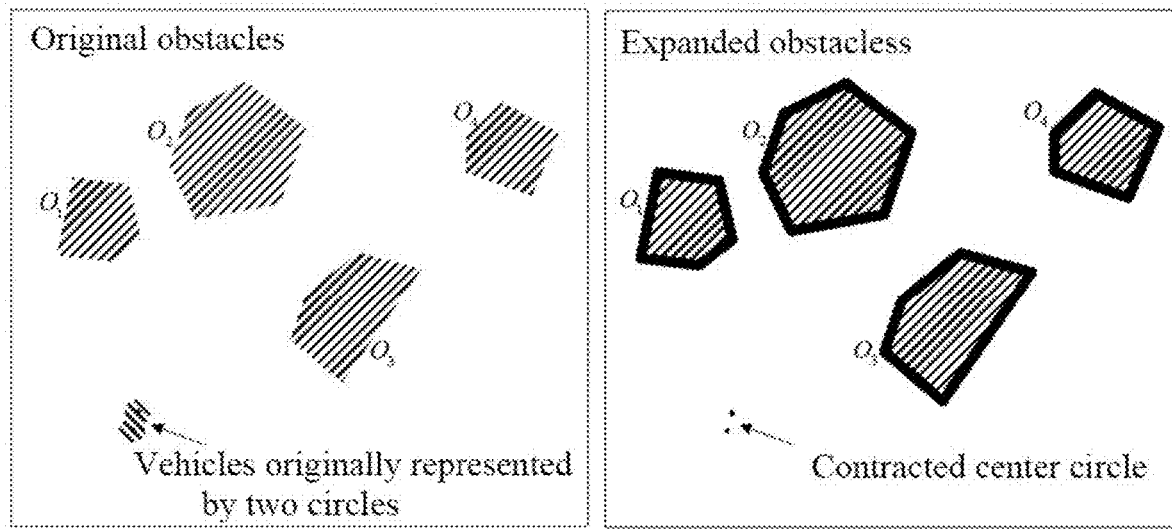
FIG. 3A  FIG. 3B

METHOD, SYSTEM, ELECTRONIC DEVICE AND STORAGE MEDIUM FOR CONSTRUCTING LOCAL CONVEX FEASIBLE SPACE

CROSS REFERENCE TO RELATED APPLICATION

This patent application claims the benefit and priority of Chinese Patent Application No.202211212124.7 filed with the China National Intellectual Property Administration on Sep. 30, 2022, the disclosure of which is incorporated by reference herein in its entirety as part of the present application.

TECHNICAL FIELD

The present disclosure relates to the technical field of automatic driving trajectory planning, in particular to a method, system, electronic device and storage medium for constructing locally convex feasible space for automatic driving trajectory planning.

BACKGROUND

At present, for the autonomous driving trajectory planning problem, there are mainly a sampling and searching-based method and an optimization-based method. The sampling and searching-based method can quickly find a drivable trajectory. However, such method discretizes the continuous space, and thus the final trajectory is often not smooth enough. The optimization-based method considers the trajectory planning problem as an optimal control problem, and can find a relatively smooth trajectory. However, when the trajectory planning problem is complex, the method usually may fall into a local optimal solution.

Recently proposed methods combine the sampling and searching-based method and the optimization-based method, to effectively find a smooth feasible trajectory. When trajectory planning of a vehicle is viewed as an optimization problem, its objective function is usually designed as a function that minimizes energy consumption, time, or other indicators, and its constraints are usually designed to meet vehicle kinematics, collision avoidance, or other requirements. However, in the optimization-based method, construction efficiency of the locally convex space directly affects a solution time of trajectory planning. When the locally convex space is designed as a circle or a polygon, it often needs to gradually detect collision with surrounding obstacles, which will greatly increase generation time of the locally convex space and limit computational efficiency of trajectory planning. To address this problem, a convex feasible set (CFS) algorithm is provided, which identifies local subsets of free space as intersections of convex cones to approximate non-convex free space. Although computational efficiency of the convex feasible set (CFS) algorithm is improved compared with the above-mentioned locally convex space generation method, the algorithm needs to perform calculation for each trajectory point when generating locally convex space, which increases computational complexity. Further, the algorithm often generates redundant space, resulting in unnecessary waste of time.

SUMMARY

An objective of embodiments of the present disclosure is to provide a method, system, electronic device and storage medium for constructing locally convex feasible space, which solves the efficiency problem of generating locally convex feasible space for automatic driving trajectory planning.

To achieve the above objective, the present disclosure provides the following technical solution.

In a first aspect, the present disclosure provides a method for constructing locally convex feasible space, including:

acquiring target information, where the target information includes an initial trajectory, size information and surrounding obstacle information of a target vehicle; the initial trajectory includes a plurality of initial motion trajectory points;

generating a quadtree map according to the target information;

determining a target distance corresponding to each initial motion trajectory point according to the quadtree map, where the target distance is a minimum distance in a target set; the target set includes a distance between a marked initial motion trajectory point and a left boundary of a target corresponding to the marked initial motion trajectory point, a distance between the marked initial motion trajectory point and a right boundary of the target corresponding to the marked initial motion trajectory point, a distance between the marked initial motion trajectory point and an upper boundary of the target corresponding to the marked initial motion trajectory point, and a distance between the marked initial motion trajectory point and a lower boundary of the target corresponding to the marked initial motion trajectory point; the left boundary of the target corresponding to the marked initial motion trajectory point is a left boundary of a largest rectangular frame corresponding to the marked initial motion trajectory point; the right boundary of the target corresponding to the marked initial motion trajectory point is a right boundary of the largest rectangular frame corresponding to the marked initial motion trajectory point; the upper boundary of the target corresponding to the marked initial motion trajectory point is a upper boundary of the largest rectangular frame corresponding to the marked initial motion trajectory point; the lower boundary of the target corresponding to the marked initial motion trajectory point is a lower boundary of the largest rectangular frame corresponding to the marked initial motion trajectory point; the largest rectangular frame is located on the quadtree map, the marked initial motion trajectory point is located inside the largest rectangular frame corresponding to the marked initial motion trajectory point, and the marked initial motion trajectory point is any initial motion trajectory point;

allocating a first locally convex feasible space to a first-type initial motion trajectory point by using the quadtree map, and allocating a second locally convex feasible space to a second-type initial motion trajectory point by using an improved convex feasible set algorithm, where the first-type initial motion trajectory point is an initial motion trajectory point with the target distance greater than or equal to a predetermined threshold; and the second-type initial motion trajectory point is an initial motion trajectory point with the target distance less than the predetermined threshold.

Optionally, determining the initial trajectory of the target vehicle includes:

acquiring pose information of the target vehicle, where the pose information includes at least position information and heading angle information;

determining the initial trajectory of the target vehicle according to the pose information and a sampling and searching-based method.

Optionally, the generating a quadtree map according to the target information includes:

expanding obstacles around the target vehicle according to the target information to obtain an expanded map;

generating the quadtree map according to the expanded map.

Optionally, the expanding obstacles around the target vehicle according to the target information to obtain an expanded map includes:

processing a space occupied by the target vehicle according to the initial trajectory and the size information of the target vehicle, to obtain an initial map;

expanding the obstacles around the target vehicle in the initial map according to the surrounding obstacle information of the target vehicle, to obtain the expanded map.

Optionally, the processing space occupied by the target vehicle according to the initial trajectory and the size information of the target vehicle, to obtain an initial map includes:

representing the space occupied by the target vehicle as two circles with equal radius according to the initial trajectory and the size information of the target vehicle, to obtain the initial map;

where the two circles of equal radius are a front circle and a rear circle, respectively;

the size information of the target vehicle includes at least a rear suspension length, a wheelbase, a front suspension length and a vehicle width of the target vehicle;

center coordinates of a front circle corresponding to a k-th initial motion trajectory point is $(p_{fx}(k), p_{fy}(k))$, and center coordinates of a rear circle corresponding to the k-th initial motion trajectory point is $$(p_{rx}(k), p_{ry}(k)),$$

$$p_{fx}(k) = p_x(k) + \frac{1}{4}(3L_m + 3L_f - L_r) \cdot \cos\theta(k);$$

$$p_{fy}(k) = p_y(k) + \frac{1}{4}(3L_m + 3L_f - L_r) \cdot \sin\theta(k);$$

$$p_{rx}(k) = p_x(k) + \frac{1}{4}(L_m + L_f - 3L_r) \cdot \cos\theta(k);$$

$$p_{ry}(k) = p_y(k) + \frac{1}{4}(L_m + L_f - 3L_r) \cdot \sin\theta(k);$$

a radius of the front circle and a radius of the rear circle corresponding to the k-th initial motion trajectory point are both $R_D$.

$$R_D = \frac{1}{2}\sqrt{\left(\frac{L_r + L_m + L_f}{2}\right)^2 + W^2};$$

$[p_x(k), p_y(k)]$ denotes coordinates of a center position of a rear wheel axle of the target vehicle in the k-th initial motion trajectory point; $\theta(k)$ denotes a heading angle of the target vehicle in the k-th initial motion trajectory point; $L_r$, $L_m$, $L_f$, W denote the rear suspension length, the wheelbase, the front suspension length and the vehicle width of the target vehicle, respectively.

Optionally, the determining a target distance corresponding to each initial motion trajectory point according to the quadtree map includes:

determining whether there is a largest rectangular frame corresponding to the initial motion trajectory point, according to the quadtree map, where the largest rectangular frame is a rectangular frame that does not intersect with obstacles;

if it is determined that there is a largest rectangular frame corresponding to the initial motion trajectory point, determining the target distance corresponding to the initial motion trajectory point according to the largest rectangular frame corresponding to the initial motion trajectory point;

if it is determined that there is not a largest rectangular frame corresponding to the initial motion trajectory point, determining the target distance corresponding to the initial motion trajectory point as 0.

Optionally, the allocating a second locally convex feasible space to a second-type initial motion trajectory point by using an improved convex feasible set algorithm includes:

determining distances between obstacles and the second-type initial motion trajectory point;

constructing, half space for the obstacles one by one in order from near to far, according to the distances between the obstacles and the second-type initial motion trajectory point;

constructing the second locally convex feasible space corresponding to the second-type initial motion trajectory point by using a convex feasible set (CFS) algorithm and the half space.

In a second aspect, the present disclosure provides a system for constructing locally convex feasible space, including:

a target information acquiring module configured to acquire target information, where the target information includes an initial trajectory, size information and surrounding obstacle information of a target vehicle; the initial trajectory includes a plurality of initial motion trajectory points;

a quadtree map generating module configured to generate a quadtree map according to the target information;

a target distance calculating module configured to determine a target distance corresponding to each initial motion trajectory point according to the quadtree map, where the target distance is a minimum distance in a target set; the target set includes a distance between a marked initial motion trajectory point and a left boundary of a target corresponding to the marked initial motion trajectory point, a distance between the marked initial motion trajectory point and a right boundary of the target corresponding to the marked initial motion trajectory point, a distance between the marked initial motion trajectory point and an upper boundary of the target corresponding to the marked initial motion trajectory point, and a distance between the marked initial motion trajectory point and a lower boundary of the target corresponding to the marked initial motion trajectory point; the left boundary of the target corresponding to the marked initial motion trajectory point is a left boundary of a largest rectangular frame corresponding to the marked initial motion trajectory point; the right boundary of the target corresponding to the marked initial motion trajectory point is a right boundary of the largest rectangular frame corresponding to the marked initial motion trajectory point; the upper boundary of the target corresponding to the marked initial motion trajectory point is a upper boundary of the largest rectangular frame corresponding to the marked initial motion trajectory point; the lower boundary of the target corresponding to the marked initial motion trajectory point is a lower boundary of the largest rectangular frame corresponding to the marked initial motion trajectory point; the largest rectangular frame is located on the quadtree map, the marked initial motion trajectory point is located inside the largest rectangular frame corresponding to the marked initial motion trajectory point, and the marked initial motion trajectory point is any initial motion trajectory point;

a locally convex feasible space constructing module configured to allocate a first locally convex feasible space to a first-type initial motion trajectory point by using the quadtree map, and allocate a second locally convex feasible space to a second-type initial motion trajectory point by using an improved convex feasible set algorithm, where the first-type initial motion trajectory point is an initial motion trajectory point with the target distance greater than or equal to a predetermined threshold; and the second-type initial motion trajectory point is an initial motion trajectory point with the target distance less than the predetermined threshold.

In a third aspect, the present disclosure provides an electronic device, including a memory and a processor, where the memory is configured to store a computer program, and the processor executes the computer program to cause the electronic device to perform the method for constructing locally convex feasible space according to the first aspect.

In a fourth aspect, the present disclosure provides a storage medium storing a computer program which, when executed by a processor, implements the method for constructing locally convex feasible space according to the first aspect.

According to specific embodiments of the present disclosure, the present disclosure discloses the following technical effects.

The present disclosure combines the quadtree map with the improved convex feasible set (CFS) algorithm to speed up the construction of the locally convex feasible space. When the quadtree map is used to allocate the locally convex feasible space, an optimizable margin, i.e., a set threshold, is used to determine whether the improved convex feasible set (CFS) algorithm is necessarily used to generate the locally convex feasible space. When the improved convex feasible set (CFS) algorithm is necessarily used to construct the locally convex feasible space, unnecessary generation of half space can be reduced; when the improved convex feasible set (CFS) algorithm is necessary, and the locally convex feasible space is assigned by the quadtree map, there is no need to use other more time-consuming methods to generate relatively large locally convex feasible space. Therefore, the present disclosure can speed up the construction of the locally convex feasible space in the automatic driving trajectory planning.

BRIEF DESCRIPTION OF THE DRAWINGS

To describe the technical solutions in the embodiments of the present disclosure or in the prior art more clearly, the following briefly describes the drawings required for describing the embodiments. Apparently, the drawings in the following description are merely some embodiments of the present disclosure, and those of ordinary skill in the art may still derive other drawings from these drawings without creative efforts.

FIG. 2 is an explanatory diagram of parameter symbols related to a size and kinematics of a target vehicle according to an embodiment of the present disclosure;

FIG. 3A and FIG. 3B are maps around the target vehicle before and after expansion according to an embodiment of the present disclosure;

DETAILED DESCRIPTION OF THE EMBODIMENTS

Technical solutions in the embodiments of the present disclosure will be clearly and completely described below with reference to the drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the scope of protection of the present disclosure.

In order to make the above objects, features and advantages of the present disclosure more clearly understood, the present disclosure will be described in further detail below with reference to the accompanying drawings and specific embodiments.

The present disclosure provides a method, system, electronic device and storage medium for constructing locally convex feasible space. In the present disclosure, locally convex feasible space for a vehicle is generated by combining a quadtree map and an improved convex feasible set (CFS) algorithm. The quadtree map can divide an obstacle environment into a free area and an occupied area. Different from an ordinary grid map, the quadtree map can use properties of the quadtree to perform a fast spatial search. After the quadtree map is established, trajectory points can be quickly assigned with locally convex feasible space, which is quite effective in the case of fewer obstacles. For trajectory points that have not been assigned a more appropriate space, the improved convex feasible set (CFS) algorithm is used to calculate and assign locally convex feasible space for them. Compared with an original algorithm, the improved convex feasible set (CFS) algorithm can reduce generation of redundant space and improve computational efficiency.

Embodiment 1

For construction of locally convex feasible space in the optimization-based trajectory planning method, the embodiment of the present disclosure provides a new method for constructing locally convex feasible space, namely, a method of combining a quadtree map with an improved convex feasible set (CFS) algorithm. Compared with other locally convex feasible space, the method can improve the construction efficiency, thereby reducing time consumption of automatic driving trajectory planning.

Figure 1:
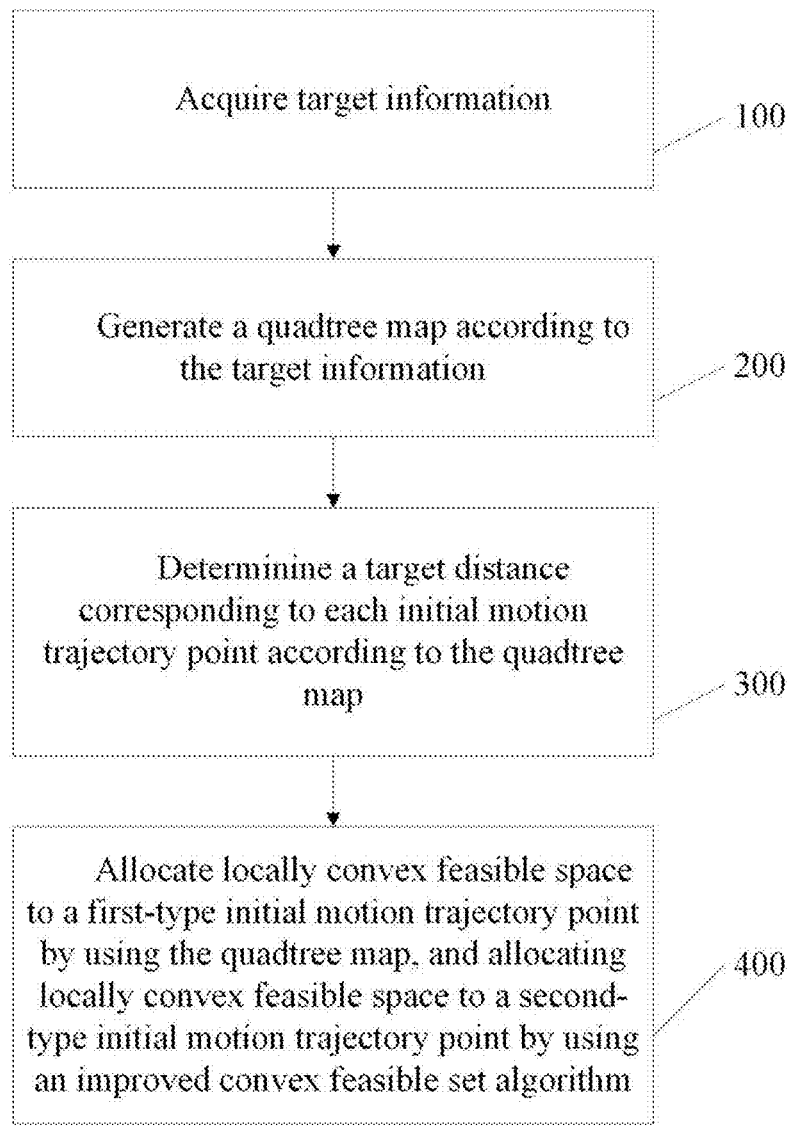
FIG. 1 is a schematic flowchart of a method for constructing locally convex feasible space according to an embodiment of the present disclosure.

As shown in FIG. 1, an embodiment of the present disclosure provides a method for constructing locally convex feasible space, which specifically includes the following steps 100-400.

In step 100, target information is acquired, where the target information includes an initial trajectory, size information and surrounding obstacle information of a target vehicle.

The surrounding obstacle information includes at least obstacle position information and obstacle size information; the obstacle size information includes a shape and a size of the obstacle.

In the embodiment of the present disclosure, the initial trajectory of the target vehicle is determined by other trajectory planning algorithm, for example, the initial trajectory of the target vehicle is quickly obtained by a sampling and searching-based method. The initial trajectory has a low smoothness, but can play a guiding role for subsequent trajectory optimization.

In view of this, acquiring the initial trajectory of the target vehicle in step 100 specifically includes steps 101 and 102.

In step 101, pose information of the target vehicle is acquired, where the pose information mainly includes position information and heading angle information.

In step 102, the initial trajectory of the target vehicle is determined according to the pose information and the sampling and searching-based method.

The initial trajectory x can be defined as n+1 initial motion trajectory points $x=[x(0)^T, x(1)^T, \ldots, x(k)^T, \ldots, x(n)^T, t_f]^T$. $x(k)=[p_x(k), p_y(k), \theta(k), v(k), \phi(k)]^T$ denotes an initial motion trajectory point of the target vehicle at a time moment $$k\frac{t_f}{n},$$

$t_f$ denotes a total time of the whole initial trajectory x, $[p_x(k), p_y(k)]$ denotes coordinates of a center position of a rear wheel axle of the target vehicle in a k-th initial motion trajectory point, and $\theta(k)$, $v(k)$, $\phi(k)$ denote a heading angle, speed and front wheel steering angle of the target vehicle in the k-th initial motion trajectory point, respectively.

As shown in FIG. 2, $L_r$, $L_m$, $L_f$, W denotes a rear suspension length, wheelbase, front suspension length and vehicle width of the target vehicle, respectively.

In step 200, a quadtree map is generated according to the target information, which specifically includes steps 201 and 202.

In step 201, according to the target information, obstacles around the target vehicle are expanded to obtain an expanded map.

In an example, in order to avoid collision between the target vehicle and the obstacles, the embodiment of the present disclosure firstly expands the obstacles around the target vehicle. FIG. 3A is an original obstacle map, and FIG. 3B is a map expanded according to a radius of a coverage circle of the target vehicle. The target vehicle can be represented by two mass center points. As long as the mass center points are outside the space occupied by the expanded obstacles, the driving area of the target vehicle is safe.

In step 202, a quadtree map is generated according to the expanded map.

Figure 4:
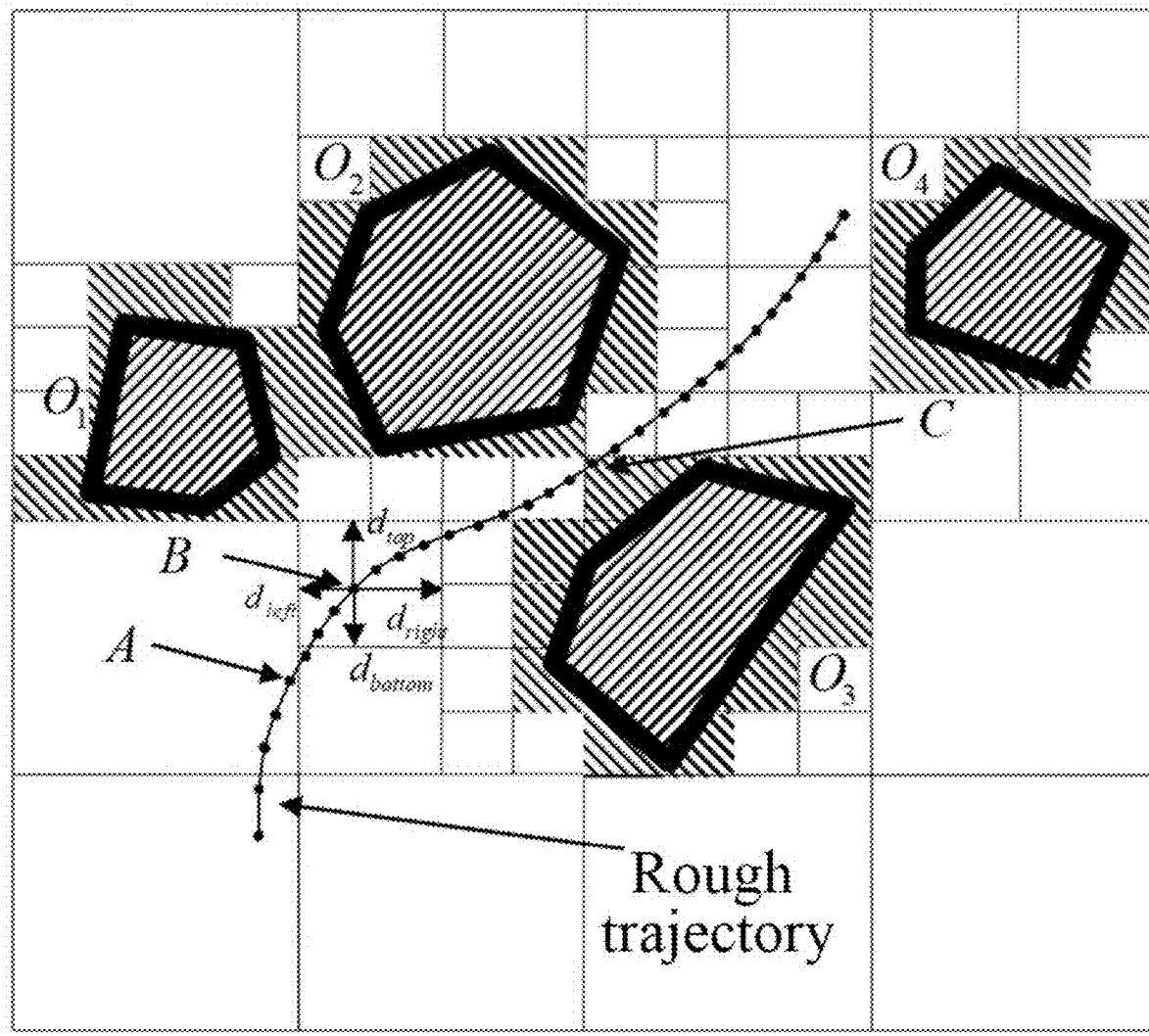
FIG. 4 is a quadtree map according to an embodiment of the present disclosure.

The quadtree map is shown in FIG. 4. A blank area denotes an area where the target vehicle can travel safely, and the other areas are areas where the target vehicle is not allowed to travel.

Further, step 201 specifically includes steps A and B.

In step A, according to the initial trajectory and size information of the target vehicle, the space occupied by the target vehicle is processed to obtain an initial map.

In step B, in the initial map, according to the surrounding obstacle information of the target vehicle, the obstacles around the target vehicle are expanded to obtain an expanded map.

Further, step A specifically includes:

according to the initial trajectory and size information of the target vehicle, representing the space occupied by the target vehicle with two circles of equal radius (see FIG. 2), to obtain an initial map.

The two circles with equal radius are a front circle and a rear circle, respectively.

The size information of the target vehicle includes at least a rear suspension length, a wheelbase, a front suspension length and a vehicle width of the target vehicle.

Center coordinates of a front circle corresponding to the k-th initial motion trajectory point is ($p_{fx}(k)$, $p_{fy}(k)$), and center coordinates of area circle corresponding to the k-th initial motion trajectory point is ($p_{rx}(k)$, $p_{ry}(k)$), and calculation formulas thereof are as follows:

$$p_{fx}(k) = p_x(k) + \frac{1}{4}(3L_m + 3L_f - L_r) \cdot \cos\theta(k);$$

$$p_{fy}(k) = p_y(k) + \frac{1}{4}(3L_m + 3L_f - L_r) \cdot \sin\theta(k);$$

$$p_{rx}(k) = p_x(k) + \frac{1}{4}(L_m + L_f - 3L_r) \cdot \cos\theta(k);$$

$$p_{ry}(k) = p_y(k) + \frac{1}{4}(L_m + L_f - 3L_r) \cdot \sin\theta(k);$$

a radius of the front circle and a radius of the rear circle corresponding to the k-th initial motion trajectory point are both $R_D$, and calculation formula thereof is as follows:

$$R_D = \frac{1}{2}\sqrt{\left(\frac{L_r + L_m + L_f}{2}\right)^2 + W^2};$$

where, $[p_x(k), p_y(k)]$ denotes coordinates of a center position of a rear wheel axle of the target vehicle in the k-th initial motion trajectory point, $\theta(k)$ denotes a heading angle of the target vehicle in the k-th initial motion trajectory point; $L_r$, $L_m$, $L_f$, W denote the rear suspension length, the wheelbase, the front suspension length and the vehicle width of the target vehicle, respectively.

In step 300, according to the quadtree map, a target distance corresponding to each initial motion trajectory point is determined, where the target distance is a minimum distance in a target set; the target set includes a distance between a marked initial motion trajectory point and a left boundary of a target corresponding to the marked initial motion trajectory point, a distance between the marked initial motion trajectory point and a right boundary of the target corresponding to the marked initial motion trajectory point, a distance between the marked initial motion trajectory point and an upper boundary of the target corresponding to the marked initial motion trajectory point, and a distance between the marked initial motion trajectory point and a lower boundary of the target corresponding to the marked initial motion trajectory point. The left boundary of the target corresponding to the marked initial motion trajectory point is a left boundary of a largest rectangular frame corresponding to the marked initial motion trajectory point; the right boundary of the target corresponding to the marked initial motion trajectory point is a right boundary of the largest rectangular frame corresponding to the marked initial motion trajectory point; the upper boundary of the target corresponding to the marked initial motion trajectory point is a upper boundary of the largest rectangular frame corresponding to the marked initial motion trajectory point; the lower boundary of the target corresponding to the marked initial motion trajectory point is a lower boundary of the largest rectangular frame corresponding to the marked initial motion trajectory point; and the largest rectangular frame is located on the quadtree map. The marked initial motion trajectory point is located inside the largest rectangular frame corresponding to the marked initial motion trajectory point, and the marked initial motion trajectory point is any initial motion trajectory point.

The step 300 specifically includes:

according to the quadtree map, determining whether there is a largest rectangular frame corresponding to the initial motion trajectory point, the largest rectangular frame being a rectangular frame that does not intersect with obstacles; if YES, determining the target distance corresponding to the initial motion trajectory point according to the largest rectangular frame corresponding to the initial motion trajectory point; and if not, determining the target distance corresponding to the initial motion trajectory point as 0.

In an example, as shown in FIG. 4, black origins denote n+1 initial motion trajectory points through which the target vehicle can travel. Using the quadtree map, an initial motion trajectory point can be assigned a largest rectangular frame BO (including no rectangular frame), which does not intersect with all obstacles. The initial motion trajectory points can be divided into three types by the target distance $d_{min}$, and calculation formula thereof is:

$$d_{min}=\min(d_{left},d_{top},d_{right},d_{bottom});$$

where $d_{left}$, $d_{top}$, $d_{right}$, $d_{bottom}$ denote distances from the initial motion trajectory point to the left boundary, upper boundary, right boundary and lower boundary of the largest rectangular frame, respectively. It is worth noting that when there is no largest rectangular frame assigned to some initial motion trajectory points, $d_{left}$, $d_{top}$, $d_{right}$, $d_{bottom}$ are set to 0.

In step 400, a first locally convex feasible space is allocated to a first-type initial motion trajectory point by using the quadtree map, and a second locally convex feasible space is allocated to a second-type initial motion trajectory point by using an improved convex feasible set algorithm. The first-type initial motion trajectory point is an initial motion trajectory point with a target distance greater than or equal to a set threshold. The second-type initial motion trajectory point is an initial motion trajectory point with the target distance less than the set threshold.

The first-type initial motion trajectory point is shown as point B (referred to as type B), where $d_{min}>d_{acceptable}$. $d_{acceptable}$ denotes an acceptable minimum optimization margin, that is, a set threshold. The area of locally convex feasible space where the initial motion trajectory point is located is relatively large, which means that there is large space for an initial motion trajectory point in the optimization process. For the initial motion trajectory point, the embodiment of the invention can directly use the local convex feasible space provided by the quadtree map to generate relatively large local convex feasible space, without using other more time-consuming methods.

Locally convex feasible space constructed by using the quadtree map is $F_i(C_i)$ i=0,1, . . . , M−1, where M denotes a number of type B, and $C_i$ denotes a center of an i-th circle.

The locally convex feasible space constructed by the quadtree map is a rectangle, where the center of the circle denotes the vehicle position.

The second-type initial motion trajectory point is shown as point A (referred to as type A), where $0<d_{min}<d_{acceptable}$. For the second-type initial motion trajectory point, since it is close to the boundary of the locally convex feasible space, its optimal region is limited to a certain extent in the trajectory optimization process. Embodiments of the present disclosure may use other methods, such as CFS, to generate convex space.

A third-type initial trajectory point is shown at point C (referred to as type C) where $d_{min}=0$, which means that it is impossible to find locally convex feasible space suitable for the third-type initial motion trajectory point in the quadtree map. Therefore, the embodiment of the present disclosure will use the same method as type A. Therefore, in the embodiment of the present disclosure, the third-type initial motion trajectory point is merged into the second-type initial motion trajectory point.

For the second-type initial motion trajectory point, the embodiment of the present disclosure uses an improved convex feasible set (CFS) algorithm to construct locally convex feasible space. The specific operations are as follows.

Figure 5:
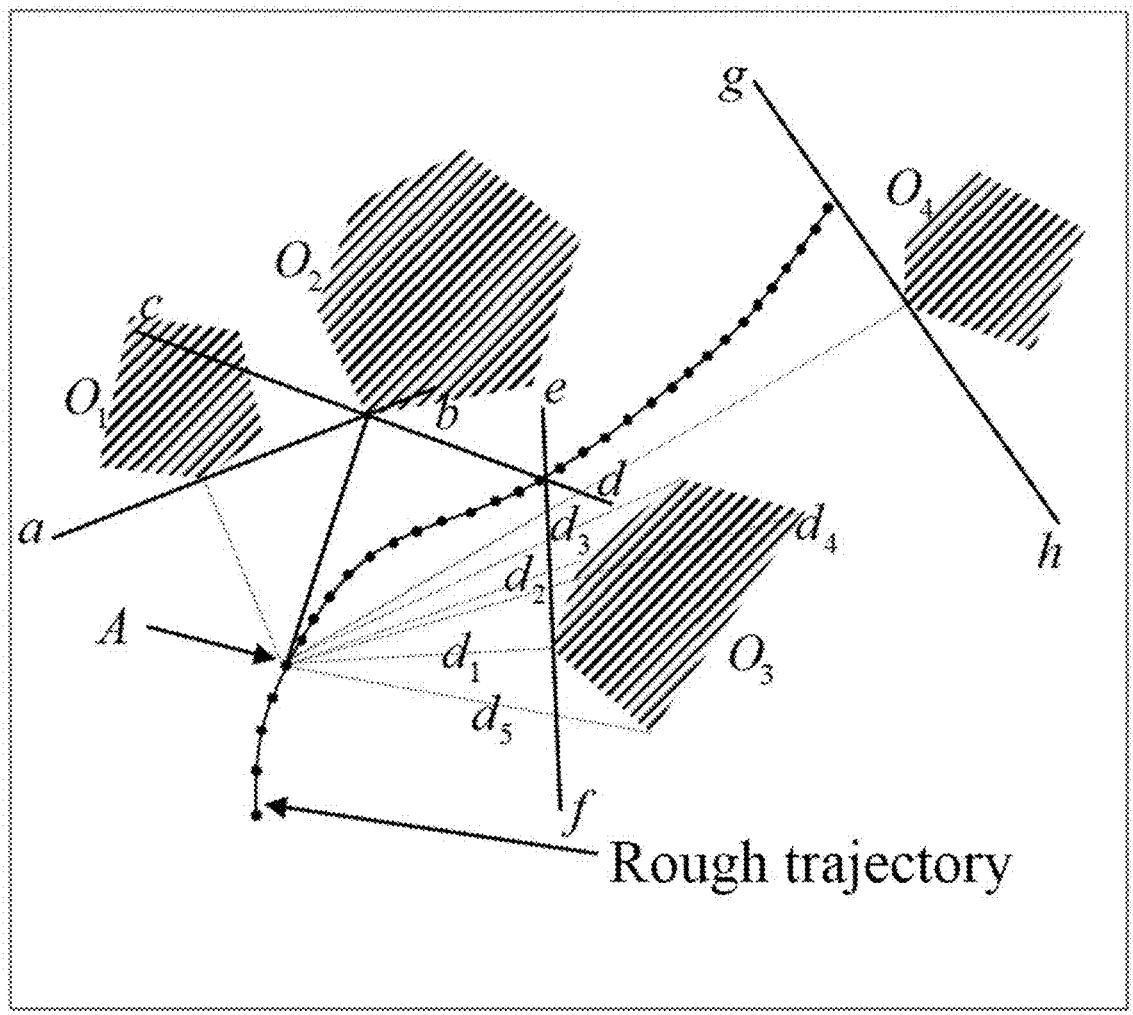
FIG. 5 is a schematic diagram of constructing locally convex feasible space by using an improved convex feasible set (CFS) method according to an embodiment of the present disclosure.

A distance between an obstacle and the second-type initial motion trajectory point is determined. A minimum distance in distances between vertices of the obstacle and the second-type initial motion trajectory point is taken as the distance between the obstacle and the second-type initial motion trajectory point. As shown in FIG. 5, the distance between an obstacle $O_3$ and the second-type initial motion trajectory point A is $d_{OA3}=\min(d1,d2,d3,d4,d5)=d1$.

According to the distance between the obstacle and the second-type initial motion trajectory point, half space is constructed for obstacles one by one from near to far. By sorting, redundant half space can be avoided.

When half space is constructed for an obstacle, it is first determined whether the obstacle is outside the constructed locally convex space area. As shown in FIG. 5, when half spaces are constructed for three obstacles of an obstacle $O_1$, an obstacle $O_2$ and an obstacle $O_3$, processing of an obstacle $O_4$ is started. At this time, it can be determined that the area occupied by the obstacle $O_4$ is on anon-A point side of a straight line cd, so no half space is constructed for the obstacle $O_4$.

Using a convex feasible set (CFS) algorithm and half space, locally convex feasible space corresponding to the second-type initial motion trajectory point is constructed.

The above-mentioned straight line cd is determined by an original convex feasible set method (CFS), and for other obstacles, the straight line cd is also determined by the original convex feasible set method (CFS).

Finally, locally convex feasible space can be generated for all initial motion trajectory points on the initial trajectory.

Embodiment 2

In order to implement a method corresponding to the above embodiment 1 for realizing corresponding functions and technical effects, a system for constructing locally convex feasible space is provided below.

Figure 6:
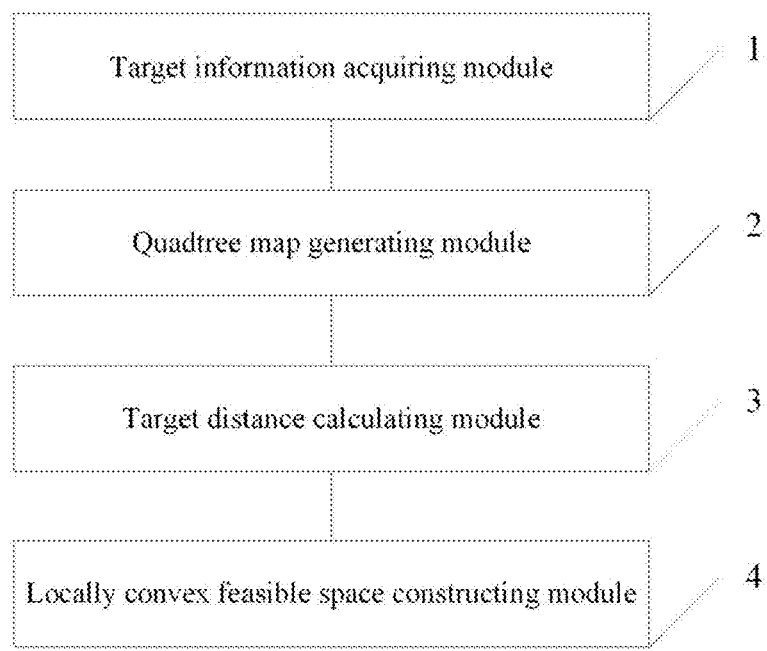
FIG. 6 is a schematic structural diagram of a method for constructing locally convex feasible space according to an embodiment of the present disclosure.

As shown in FIG. 6, an embodiment of the present disclosure provides a system for constructing locally convex feasible space, which includes a target information acquiring module 1, a quadtree map generating module 2, a target distance calculating module 3 and a locally convex feasible space constructing module 4.

The target information acquiring module 1 is configured to acquire target information, where the target information includes an initial trajectory, size information and surrounding obstacle information of a target vehicle; the initial trajectory includes a plurality of initial motion trajectory points.

The quadtree map generating module 2 is configured to generate a quadtree map according to the target information.

The target distance calculating module 3 is configured to determine a target distance corresponding to each initial motion trajectory point according to the quadtree map, where the target distance is a minimum distance in a target set; the target set includes a distance between a marked initial motion trajectory point and a left boundary of a target corresponding to the marked initial motion trajectory point, a distance between the marked initial motion trajectory point and a right boundary of the target corresponding to the marked initial motion trajectory point, a distance between the marked initial motion trajectory point and an upper boundary of the target corresponding to the marked initial motion trajectory point, and a distance between the marked initial motion trajectory point and a lower boundary of the target corresponding to the marked initial motion trajectory point; the left boundary of the target corresponding to the marked initial motion trajectory point is a left boundary of a largest rectangular frame corresponding to the marked initial motion trajectory point; the right boundary of the target corresponding to the marked initial motion trajectory point is a right boundary of the largest rectangular frame corresponding to the marked initial motion trajectory point; the upper boundary of the target corresponding to the marked initial motion trajectory point is a upper boundary of the largest rectangular frame corresponding to the marked initial motion trajectory point; the lower boundary of the target corresponding to the marked initial motion trajectory point is a lower boundary of the largest rectangular frame corresponding to the marked initial motion trajectory point; the largest rectangular frame is located on the quadtree map, the marked initial motion trajectory point is located inside the largest rectangular frame corresponding to the marked initial motion trajectory point, and the marked initial motion trajectory point is any initial motion trajectory point.

The locally convex feasible space constructing module 4 is configured to allocate a first locally convex feasible space to a first-type initial motion trajectory point by using the quadtree map, and allocate a second locally convex feasible space to a second-type initial motion trajectory point by using an improved convex feasible set algorithm, where the first-type initial motion trajectory point is an initial motion trajectory point with the target distance greater than or equal to a set threshold; and the second-type initial motion trajectory point is an initial motion trajectory point with the target distance less than the set threshold.

Embodiment 3

An embodiment of the present disclosure provides an electronic device including a memory and a processor. The memory is used to store a computer program, and the processor runs the computer program to cause the electronic device implement the method for constructing locally convex feasible space according to the embodiment 1.

Optionally, the above electronic device may be a server.

In addition, an embodiment of the present disclosure further provides a storage medium for storing a computer program which, when executed by a processor, implements the method for constructing locally convex feasible space according to the embodiment 1.

The present disclosure combines the quadtree map with the improved convex feasible set (CFS) algorithm to speed up the construction of the locally convex feasible space. When the quadtree map is used to allocate the locally convex feasible space, an optimizable margin, i.e., a set threshold, is used to determine whether it is necessary to use the improved convex feasible set (CFS) algorithm to generate the locally convex feasible space. In the improved convex feasible set (CFS) algorithm, the obstacles are sorted by distances from the obstacles to the initial trajectory point, and finally, local convex feasible space is generated for the initial trajectory point from near to far to reduce unnecessary generation of halfspace. The present disclosure can speed up the construction of the locally convex feasible space in trajectory planning, which has an important role in speeding up the optimization-based trajectory planning method.

The various embodiments in this specification are described in a progressive manner, and each embodiment focuses on differences from other embodiments, and the same and similar parts between the various embodiments can be referred to each other. For the system disclosed in the embodiment, since it corresponds to the method disclosed in the embodiment, the description is relatively simple, and the relevant part can be referred to the description of the method.

In this specification, specific examples have been used to illustrate the principle and implementation of the present disclosure. The description of the above embodiments is only used to help understand the method of the present disclosure and its core idea; meanwhile, for those of ordinary skill in the art, according to ideas of the present disclosure, there will be changes in specific implementations and application ranges. In summary, the contents of this specification should not be construed as limiting the present disclosure.

What is claimed is:

1. A method for constructing locally convex feasible space, comprising:

acquiring target information, wherein the target information comprises an initial trajectory, size information and surrounding obstacle information of a target vehicle; the initial trajectory comprises a plurality of initial motion trajectory points;

generating a quadtree map according to the target information;

determining a target distance corresponding to each initial motion trajectory point according to the quadtree map, wherein the target distance is a minimum distance in a target set; the target set comprises a distance between a marked initial motion trajectory point and a left boundary of a target corresponding to the marked initial motion trajectory point, a distance between the marked initial motion trajectory point and a right boundary of the target corresponding to the marked initial motion trajectory point, a distance between the marked initial motion trajectory point and an upper boundary of the target corresponding to the marked initial motion trajectory point, and a distance between the marked initial motion trajectory point and a lower boundary of the target corresponding to the marked initial motion trajectory point;

the left boundary of the target corresponding to the marked initial motion trajectory point is a left boundary of a largest rectangular frame corresponding to the marked initial motion trajectory point; the right boundary of the target corresponding to the marked initial motion trajectory point is a right boundary of the largest rectangular frame corresponding to the marked initial motion trajectory point; the upper boundary of the target corresponding to the marked initial motion trajectory point is a upper boundary of the largest rectangular frame corresponding to the marked initial motion trajectory point; the lower boundary of the target corresponding to the marked initial motion trajectory point is a lower boundary of the largest rectangular frame corresponding to the marked initial motion trajectory point; the largest rectangular frame is located on the quadtree map, the marked initial motion trajectory point is located inside the largest rectangular frame corresponding to the marked initial motion trajectory point, and the marked initial motion trajectory point is any initial motion trajectory point;

allocating a first locally convex feasible space to a first-type initial motion trajectory point by using the quadtree map, and allocating a second locally convex feasible space to a second-type initial motion trajectory point by using an improved convex feasible set algorithm, wherein the first-type initial motion trajectory point is an initial motion trajectory point with the target distance greater than or equal to a predetermined threshold; and the second-type initial motion trajectory point is an initial motion trajectory point with the target distance less than the predetermined threshold.

2. The method according to claim 1, wherein the determining the initial trajectory of the target vehicle comprises:
acquiring pose information of the target vehicle, wherein the pose information comprises at least position information and heading angle information;
determining the initial trajectory of the target vehicle according to the pose information and a sampling and searching-based method.

3. The method according to claim 1, wherein the generating a quadtree map according to the target information comprises:
expanding obstacles around the target vehicle according to the target information to obtain an expanded map;
generating the quadtree map according to the expanded map.

4. The method according to claim 3, wherein the expanding obstacles around the target vehicle according to the target information to obtain an expanded map comprises:
processing a space occupied by the target vehicle according to the initial trajectory and the size information of the target vehicle, to obtain an initial map;
expanding the obstacles around the target vehicle in the initial map according to the surrounding obstacle information of the target vehicle, to obtain the expanded map.

5. The method according to claim 4, wherein the processing a space occupied by the target vehicle according to the initial trajectory and the size information of the target vehicle, to obtain an initial map comprises:
representing the space occupied by the target vehicle with two circles of equal radius, according to the initial trajectory and the size information of the target vehicle, to obtain the initial map;
wherein the two circles of equal radius are a front circle and a rear circle, respectively;
the size information of the target vehicle comprises at least a rear suspension length, a wheelbase, a front suspension length and a vehicle width of the target vehicle;
center coordinates of a front circle corresponding to a k-th initial motion trajectory point is $(p_{fx}(k), p_{fy}(k))$, and center coordinates of a rear circle corresponding to the k-th initial motion trajectory point is $(p_{rx}(k), p_{ry}(k))$, $$p_{fx}(k) = p_x(k) + \frac{1}{4}(3L_m + 3L_f - L_r) \cdot \cos\theta(k);$$

$$p_{fy}(k) = p_y(k) + \frac{1}{4}(3L_m + 3L_f - L_r) \cdot \sin\theta(k);$$

$$p_{rx}(k) = p_x(k) + \frac{1}{4}(L_m + L_f - 3L_r) \cdot \cos\theta(k);$$

$$p_{ry}(k) = p_y(k) + \frac{1}{4}(L_m + L_f - 3L_r) \cdot \sin\theta(k);$$

a radius of the front circle and a radius of the rear circle corresponding to the k-th initial motion trajectory point are both $R_D$;

$$R_D = \frac{1}{2}\sqrt{\left(\frac{L_r + L_m + L_f}{2}\right)^2 + W^2};$$

$[p_x(k), p_y(k)]$ denotes coordinates of a center position of a rear wheel axle of the target vehicle in the k-th initial motion trajectory point, $\theta(k)$ denotes a heading angle of the target vehicle in the k-th initial motion trajectory point; $L_r$, $L_m$, $L_f$, $W$ denote the rear suspension length, the wheelbase, the front suspension length and the vehicle width of the target vehicle, respectively.

6. The method according to claim 1, wherein the determining a target distance corresponding to each initial motion trajectory point according to the quadtree map comprises:
determining whether there is a largest rectangular frame corresponding to the initial motion trajectory point, according to the quadtree map, wherein the largest rectangular frame is a rectangular frame that does not intersect with obstacles;
if it is determined that there is a largest rectangular frame corresponding to the initial motion trajectory point, determining the target distance corresponding to the initial motion trajectory point according to the largest rectangular frame corresponding to the initial motion trajectory point;
if it is determined that there is not a largest rectangular frame corresponding to the initial motion trajectory point, determining the target distance corresponding to the initial motion trajectory point as 0.

7. The method according to claim 1, wherein the allocating a second locally convex feasible space to a second-type initial motion trajectory point by using an improved convex feasible set algorithm comprises:
determining distances between obstacles and the second-type initial motion trajectory point;

constructing half space for the obstacles one by one from near to far, according to the distances between the obstacles and the second-type initial motion trajectory point;

constructing the second locally convex feasible space corresponding to the second-type initial motion trajectory point by using a convex feasible set (CFS) algorithm and the half space.

8. A system for constructing locally convex feasible space, comprising:

a target information acquiring module, configured to acquire target information, wherein the target information comprises an initial trajectory, size information and surrounding obstacle information of a target vehicle; the initial trajectory comprises a plurality of initial motion trajectory points;

a quadtree map generating module, configured to generate a quadtree map according to the target information;

a target distance calculating module, configured to determine a target distance corresponding to each initial motion trajectory point according to the quadtree map, wherein the target distance is a minimum distance in a target set; the target set comprises a distance between a marked initial motion trajectory point and a left boundary of a target corresponding to the marked initial motion trajectory point, a distance between the marked initial motion trajectory point and a right boundary of the target corresponding to the marked initial motion trajectory point, a distance between the marked initial motion trajectory point and an upper boundary of the target corresponding to the marked initial motion trajectory point, and a distance between the marked initial motion trajectory point and a lower boundary of the target corresponding to the marked initial motion trajectory point; the left boundary of the target corresponding to the marked initial motion trajectory point is a left boundary of a largest rectangular frame corresponding to the marked initial motion trajectory point; the right boundary of the target corresponding to the marked initial motion trajectory point is a right boundary of the largest rectangular frame corresponding to the marked initial motion trajectory point; the upper boundary of the target corresponding to the marked initial motion trajectory point is a upper boundary of the largest rectangular frame corresponding to the marked initial motion trajectory point; the lower boundary of the target corresponding to the marked initial motion trajectory point is a lower boundary of the largest rectangular frame corresponding to the marked initial motion trajectory point; the largest rectangular frame is located on the quadtree map, the marked initial motion trajectory point is located inside the largest rectangular frame corresponding to the marked initial motion trajectory point, and the marked initial motion trajectory point is any initial motion trajectory point;

a locally convex feasible space constructing module, configured to allocate a first locally convex feasible space to a first-type initial motion trajectory point by using the quadtree map, and allocate a second locally convex feasible space to a second-type initial motion trajectory point by using an improved convex feasible set algorithm, wherein the first-type initial motion trajectory point is an initial motion trajectory point with the target distance greater than or equal to a predetermined threshold; and the second-type initial motion trajectory point is an initial motion trajectory point with the target distance less than the predetermined threshold.

9. An electronic device, comprising a memory and a processor, wherein the memory is configured to store a computer program, and the processor executes the computer program to cause the electronic device to perform the method according to any claims 1.

10. A storage medium storing a computer program which, when executed by a processor, implements the method according to claim 1.

* * * * *